United States Patent
Watanabe

(10) Patent No.: US 6,275,949 B1
(45) Date of Patent: Aug. 14, 2001

(54) POWER CONTROLLER FOR A PERIPHERAL DEVICE THAT STORES THE ON/OFF STATE THEREOF WHEN POWER IS REMOVED FROM THE DEVICE

(75) Inventor: Yoshinori Watanabe, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/267,677

(22) Filed: Mar. 15, 1999

(30) Foreign Application Priority Data

Mar. 13, 1998 (JP) .................................................. 10-063615

(51) Int. Cl.[7] ............................... G06F 1/26; G06F 1/28; G06F 1/30
(52) U.S. Cl. ................. 713/324; 713/300; 713/310; 713/320; 713/321; 713/322; 713/323; 713/330; 713/340; 710/260; 710/267
(58) Field of Search ................... 713/300–340; 710/260, 267

(56) References Cited

U.S. PATENT DOCUMENTS

| | | | |
|---|---|---|---|
| 5,213,107 | * | 5/1993 | Fujii ..................................... 128/710 |
| 5,594,426 | * | 1/1997 | Ushijima et al. ............... 340/825.02 |
| 5,864,336 | * | 1/1999 | Yano ................................... 713/321 |

FOREIGN PATENT DOCUMENTS 62-13609    1/1989    (JP) .

* cited by examiner

*Primary Examiner*—Rupal Dharia
(74) *Attorney, Agent, or Firm*—Young & Thompson

(57) ABSTRACT

After an activation of the CPU in a peripheral device in a computer system, a determination is made whether an external power supply input or operation of a software switch is inputted as a trigger. Based on this determination, the peripheral device is left ON or turned OFF so as to be in the same state as when power was last removed. When it is not necessary to supply the power to the peripheral device, the power to the CPU is turned OFF to reduce power consumption.

3 Claims, 8 Drawing Sheets

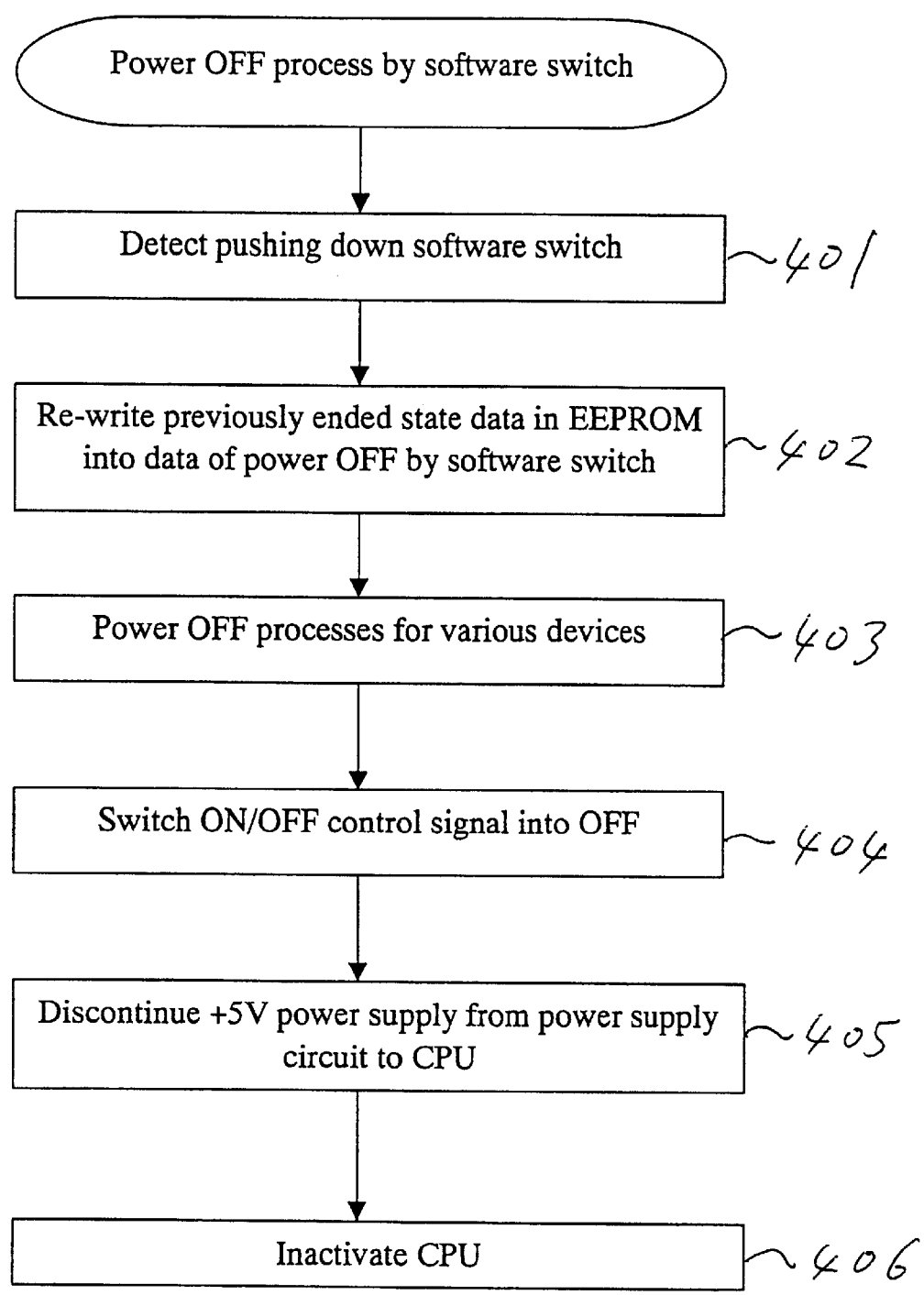

POWER CONTROLLER FOR A PERIPHERAL DEVICE THAT STORES THE ON/OFF STATE THEREOF WHEN POWER IS REMOVED FROM THE DEVICE

BACKGROUND OF THE INVENTION

The present invention relates to a power controller for peripheral devices in a computer system utilizing a software switch.

In prior art, various mechanical switches have been used for computer peripheral devices such as monitors. The mechanical switch is disadvantageous in consumption of parts caused by frequent use and in operational and mechanical deficiencies, whereby the mechanical switch may fail. If the mechanical switch fails, the computer peripheral device such as monitor becomes inoperable.

As the main switch, a software switch has been proposed. The software switch detects whether or not the switch is pushed down instantly. It is therefore sufficient that the switch is instantly pushed down for allowing the software switch to detect an instant contact. This is advantageous in avoidance of the failure of the switch.

When the software switch is used as the main switch for the monitor, it is necessary to do power ON of a main power switch for the software switch. In a software switch, power is always supplied through a power cable to a CPU as a part of the software switch, so that the CPU is always in operable state. The power supplies to the other parts than the software switch are under the control of the CPU.

This software switch in use of the main power switch for the monitor is incapable of doing what the mechanical switches can do. The mechanical switch allows that the power cable of the monitor is plugged into a socket of the computer so that the main switch of the monitor is left in an ON state, whereby switching ON the main power switch of the computer causes an automatic switching ON of the monitor. By contrast to the mechanical switch, the software switch in use for the main power switch for the monitor subjects the power supply to the other parts of the software switch to strict control of the CPU, for which reason even if the power cable of the monitor is plugged into a socket of the computer, then there is the problem that the ON/OFF operation of the monitor power supply is associated with ON/OFF operation of the computer.

Various peripheral devices are connected to the advanced computer system and the same number of the switches as the peripheral devices are required. It is of course convenient for users that a single switch is effective for power ON to all of the peripheral devices.

In the above circumstances, it bad been required to develop a power controller for a software switch.

SUMMARY OF THE INVENTION

Accordingly, it is an object of the present invention to provide a novel power controller for a software switch free from the above problems.

In accordance with the present invention, software is executed after an activation of the CPU in order to judge whether an external power supply commence as a first eternal factor or an operation of a software switch in the external power supply as a second external factor is inputted as a trigger, whereby the software selects any one of different power ON operations, so as to start a computer system in the same state as a previously ended state of the system. When it is not necessary to supply the power to the peripheral devices such as the monitor, it is also discontinued to supply the power to the CPU as a part of the software switch, whereby a power consumption is reduced.

The previously ended states of the individual software switches are stored in EEPROM, so that the first or second external factor is inputted thereby allowing a power supply circuit to supply a power of +5V for a predetermined time period from an activation of the CPU to processing ON/OFF control signals. Immediately after activation of the CPU, the ON/OFF control signal becomes ON so that the power supply circuit always continues to supply the power to the CPU. The CPU refers to data about the previously ended state stored in EEPROM so that the CPU performs the power control based upon the previously ended state data.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

DESCRIPTION PREFERRED EMBODIMENTS

The present invention provides a power controller for a peripheral device, comprising: a non-volatile memory for storing data indicating ending states of the peripheral device; a switching device for selecting a power OFF for a device ON state and a power ON for a device OFF state; a power supply for generating a power for a predetermined time period in external power supply mode and also continuing to supply the power during when an ON/OFF control signal is in an OFF state; and a processor being connected to the power supply for receiving the power from the power supply, and the processor being connected to the non-volatile memory, wherein the processor switches the ON/OFF control signal into ON state in a power supply commencement timing from the power supply, and the processor also reads data from the non-volatile memory so that the processor accomplishes a power ON/OFF control of the peripheral device based upon the data and the selected one of the power ON and power OFF by the switching device, and the processor also re-writes the data in the non-volatile memory into new data indicating a power supply discontinuation except in case of operations of the switch or re-writes the data in the non-volatile memory into other data indicating another power supply discontinuation caused by the operations of the switch.

It is preferable that the processor instructs a power ON of the device when the data indicate that the power OFF of the device is caused except in case of operations of the switching device, the processor instructs a power supply to the device when the data indicate that the power OFF of the device is caused by the operations of the switching device and also when a current state of the switching device is in an ON state, and the processor sustains the power OFF of the device and also switches the ON/OFF control signal into OFF when the data indicate that the power OF of the device is caused by operations of the switching device and also when the current state of the switching device is in an OFF state.

A computer system comprises a computer and at least a peripheral device accommodating a power controller, so that power is supplied from the computer system to the power supply during a power ON of the computer system.

Figure 1:
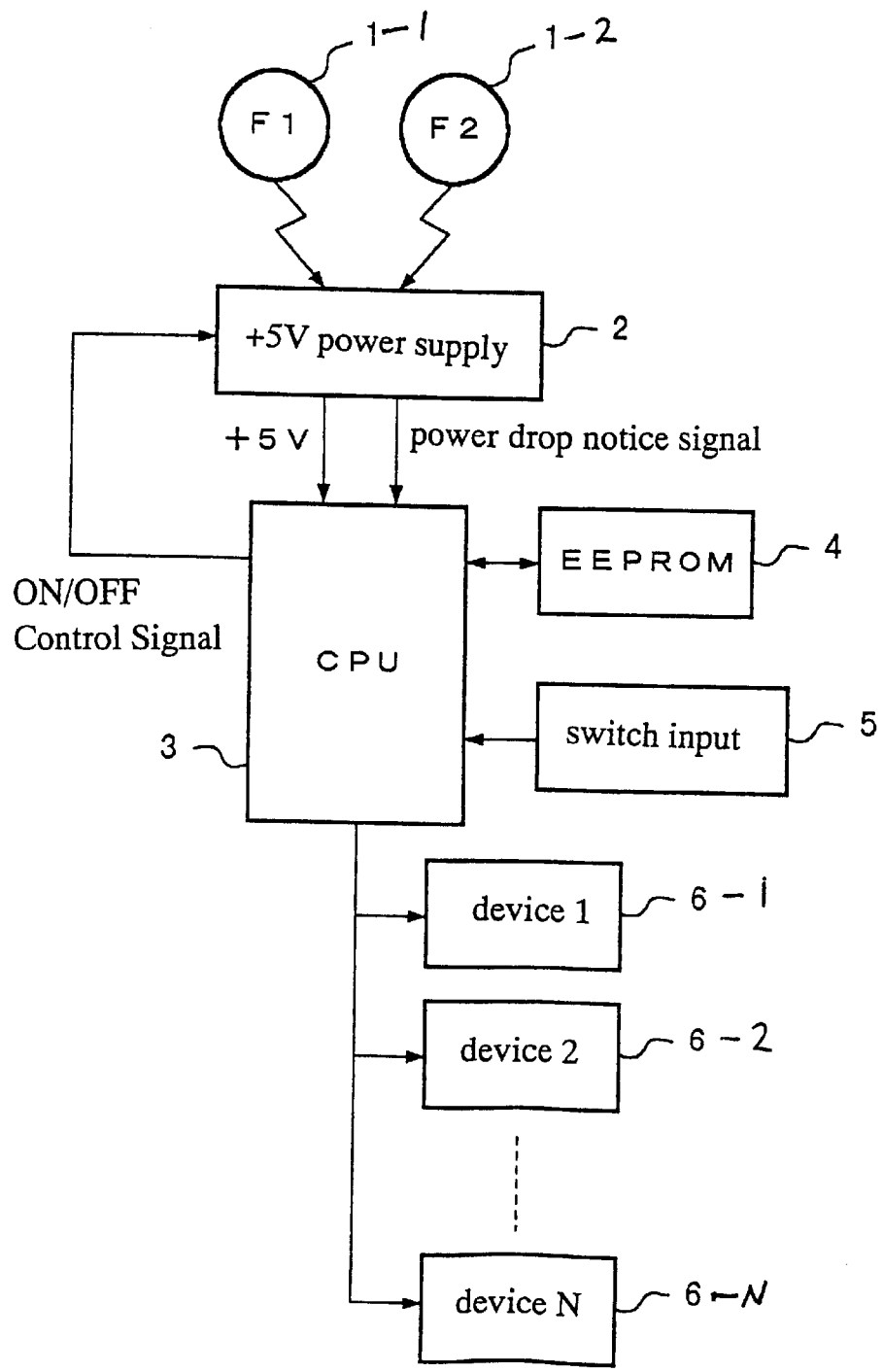
FIG. 1 is a block diagram illustrative of a power controller for software switch in a first embodiment in accordance with the present invention.

A first embodiment according to the present invention will be described in detail with reference to FIG. 1 that shows a power controller that is accommodated in a peripheral device, such as a monitor. A power supply circuit 2 is provided for supplying a power of +5V to a CPU 3 in synchronization with an input of a trigger of either a first external factor F1 or a second external factor F2. The first external factor F1 is a trigger generated by connecting a power cable to the monitor. Namely, the first external factor F1 is a trigger generated by a power supply commencement through the power cable. The second external factor F2 is a trigger generated by pushing down a software switch during a power supply through a power cable. The CPU 3 controls other parts than the software switch and also outputs ON/OFF control signals for controlling the power supply circuit. The EEPROM 4 is provided for storing data of previously ended states. A switch input section is also provided. A plurality of devices 6-1, 6-2 - - - 6-N are provided for executions of the peripheral terminals. The power supply circuit 2 supplies the power of +5V to the CPU 3 at a timing of a trigger input of either the first or second external factor F1 or F2 for a predetermined time period from the activation of the CPU up to processing the ON/OFF control signal. Namely, the supply of the +5V power to the CPU 3 causes the activation of the CPU 3 whereby the CPU 3 make the ON/OFF control signal into ON state. If the ON/OFF control signal is in OFF state, the supply of the +5V power to the CPU 3 is discontinued. Switching the ON/OFF signal into the ON state results in that the +5V power is always continued to be supplied from the power supply circuit 2 to the CPU 3.

Thereafter, the CPU 3 reads out the data of the previously ended state from the EEPROM 4 so that the CPU 3 controls activation of the system and power OFF operation based upon the previously ended state data.

Figure 2:
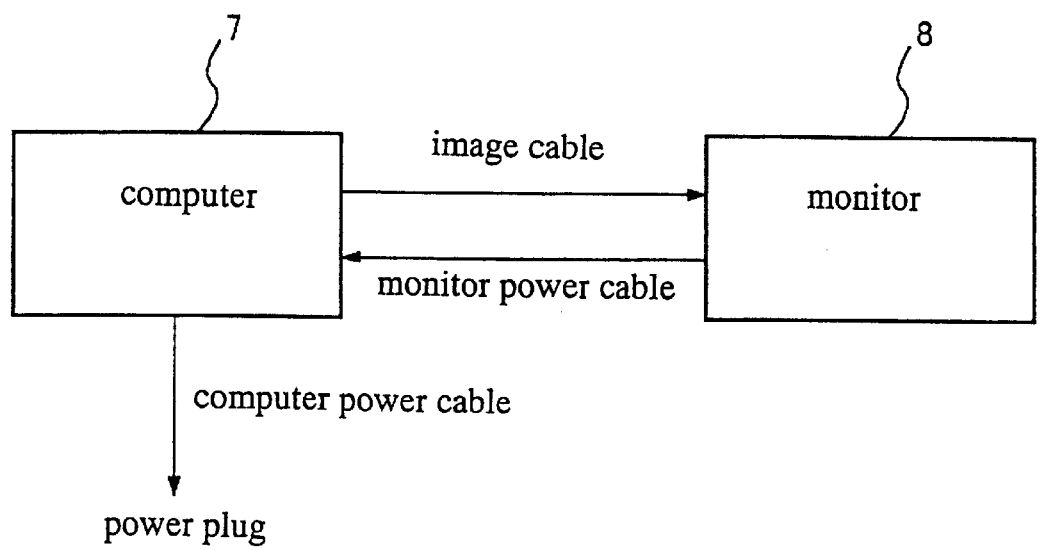
FIG. 2 is a block diagram illustrative of a connection between a computer and a monitor accommodating a power controller of FIG. 1

As illustrated in FIG. 2, a computer 7 is connected to a monitor 8 through an image cable and a monitor power cable. The computer 7 is also connected through a computer power cable to a power plug. The monitor 8 accommodates the above power controller for software switch of FIG. 1. No power are supplied to the computer 7 and the monitor 8 unless the computer is activated.

If the computer 7 is activated to supply the power to the monitor 8, this means that the first trigger of the first external factor F1 is generated, whereby the +5V power is always continued to be supplied to the CPU 3. The CPU reads the previously ended state data out of the EEPROM 4. If the previously ended state is any of the states except that the software switch was pushed down, the system of the monitor starts.

If the previously ended state is that the software switch was pushed down, the switch input section 5 detects whether or not the current power supply was caused by pushing down the software switch. If the current power supply was caused by pushing down the software switch, then the previously ended state data as stored in the EEPROM 4 are re-written into new data on start of the system for subsequent start up operation of the system. If the current power supply is not caused by pushing down the software switch, then the power OFF operation is made by the system of the monitor 8.

Figure 3:
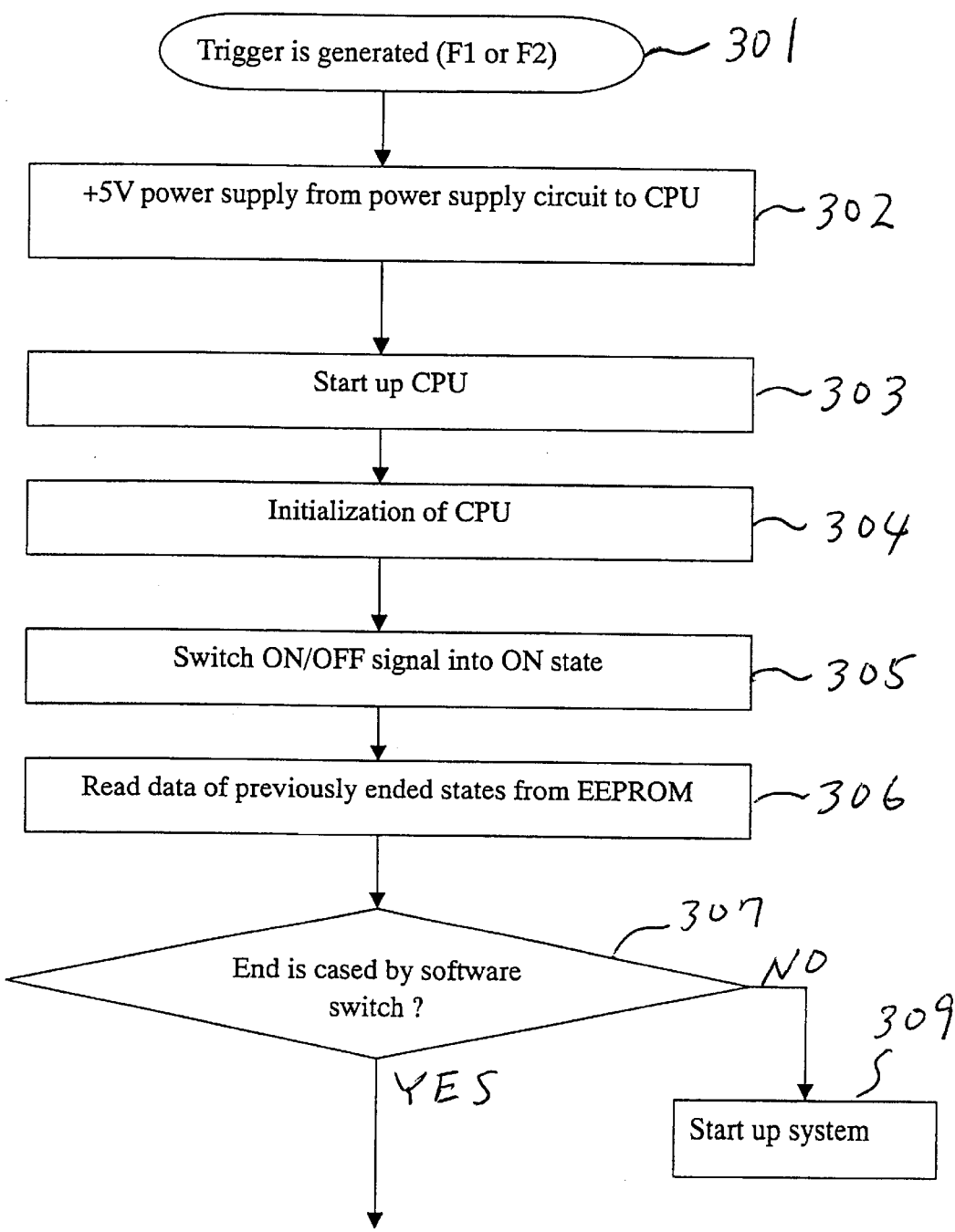
FIG.3 is a flow chart illustrative of sequential operations of a power controller of FIG. 1 after a power is supplied to a monitor in a first embodiment in accordance with the present invention.

With reference to FIG. 3, sequential operations of a power controller of FIG. 1 after power is supplied to the monitor will be described as follows.

In a first step 301, there is generated a trigger of either a first external factor F1 and a second external factor F2, wherein the first external factor F1 is a trigger generated by connecting a power cable to the monitor, namely, the first external factor F1 is a trigger generated by a power supply commencement through the power cable, and the second external factor F2 is a trigger generated by pushing down a software switch during a power supply through a power cable.

In a second step 302, the power supply circuit supplies the +5V power to the CPU 3.

In a third step 303, the CPU 3 is activated.

In a fourth step 304, initialization programs are executed to initialize the CPU 3 for individual I/P ports processes.

In a fifth step 305, the ON/OFF control signal becomes ON in order to render the power supply circuit always continuously supply the +5V power to the CPU 3, whereby the power supply circuit is switched from the temporary power supply mode into the continuous power supply mode.

In a sixth step 306, the CPU 3 reads the previously ended state data out of the EEPROM 4.

In a seventh step 307, the CPU 3 judges whether or not the previous end was caused by the software switch.

In a ninth step 309, if the previous end was not caused by the software switch, then the previous end is considered to be caused by the power supply discontinuation due to the power OFF of the computer, whereby the system is started up.

In an eighth step 308, if the previous end was caused by the software switch with user's intention, data indicating the current pushing down state of the software switch are fetched from the switch detector section.

In a twelfth step 312, when the software switch is pushed down in the OFF state, the ON/OFF control signal to the power supply circuit is switched into OFF.

In a thirteenth step 313, the +5V power supply from the power supply circuit to the CPU 3 is discontinued, whereby the CPU 3 is also inactivated and the monitor system shows no start up.

In a tenth step 310, if the software switch is currently in ON state, then the CPU 3 re-writes the previously ended state data as stored in the EEPROM 4 into new data of starting up the system.

In an eleventh step 311, the CPU 3 starts up the system. The time period of pushing down the software switch is much longer than a time period from the start of the first step 301 to the completion of the eighth step 308. This means that the pushing down state of the software switch still remains until in the eighth step 308. Unless no power is applied form the power supply circuit through the power cable, the power supply commencement can be obtained by only operation of the software switch.

Figure 4:
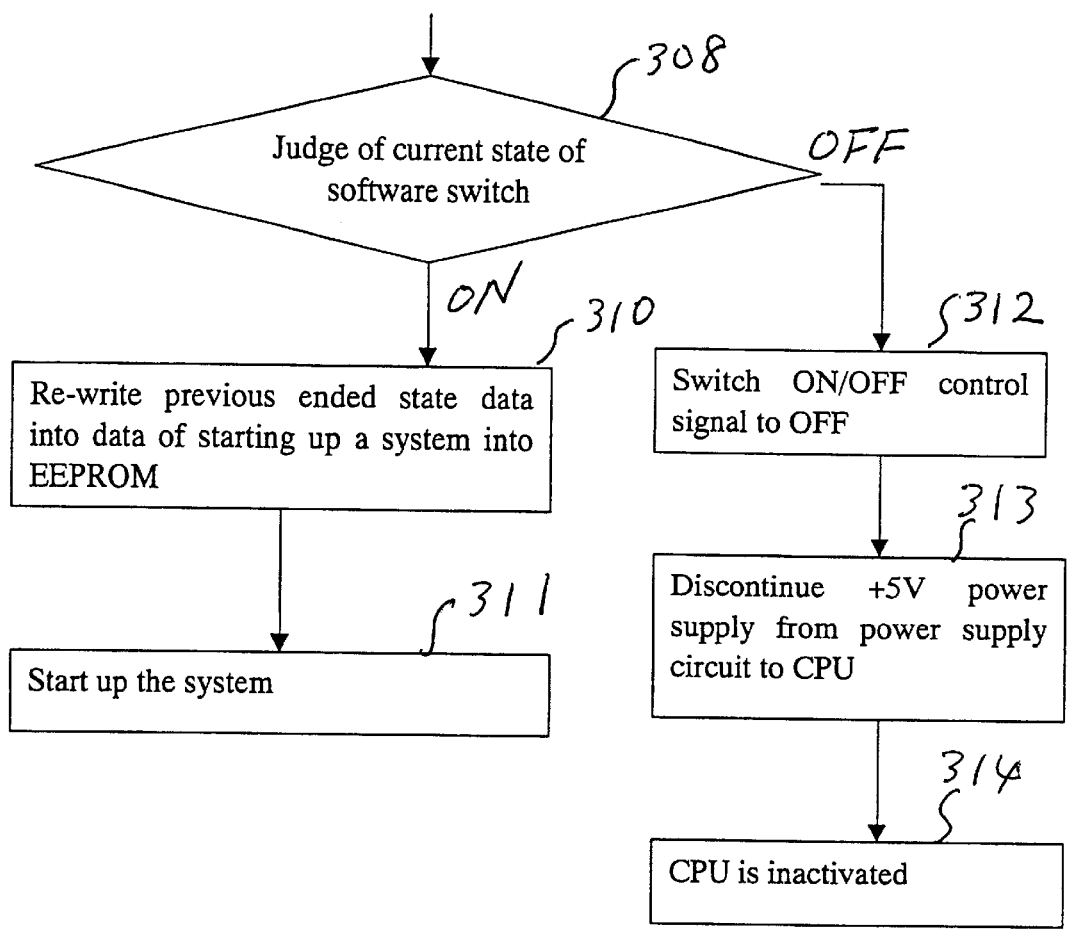
FIG. 4 is a flow chart illustrative of sequential operations of a power controller of FIG. 1 for a power OFF by a software switch for system down.

Sequential operations of a power controller of FIG. 1 for a power OFF by a software switch for system down will subsequently be described with reference to FIG. 4.

In a first step 401, the switch detector section detects that the software switch is pushed down.

In a second step 402, the CPU 3 re-writes the previously ended state data stored in the EEPROM 4 into new data of power OFF by the software switch.

In a third step 403, power OFF operations are executed for various devices.

In a fourth step 404, the CPU 3 switches the ON/OFF control signal to be OFF for supply of OFF signal to the power supply circuit.

In a fifth step 405, the power supply circuit as having received the OFF signal discontinues the supply to the +5V power to the CPU 3.

In a sixth step 406, the CPU 3 is inactivated by discontinuation of the +5V power supply from the power supply circuit.

Figure 5:
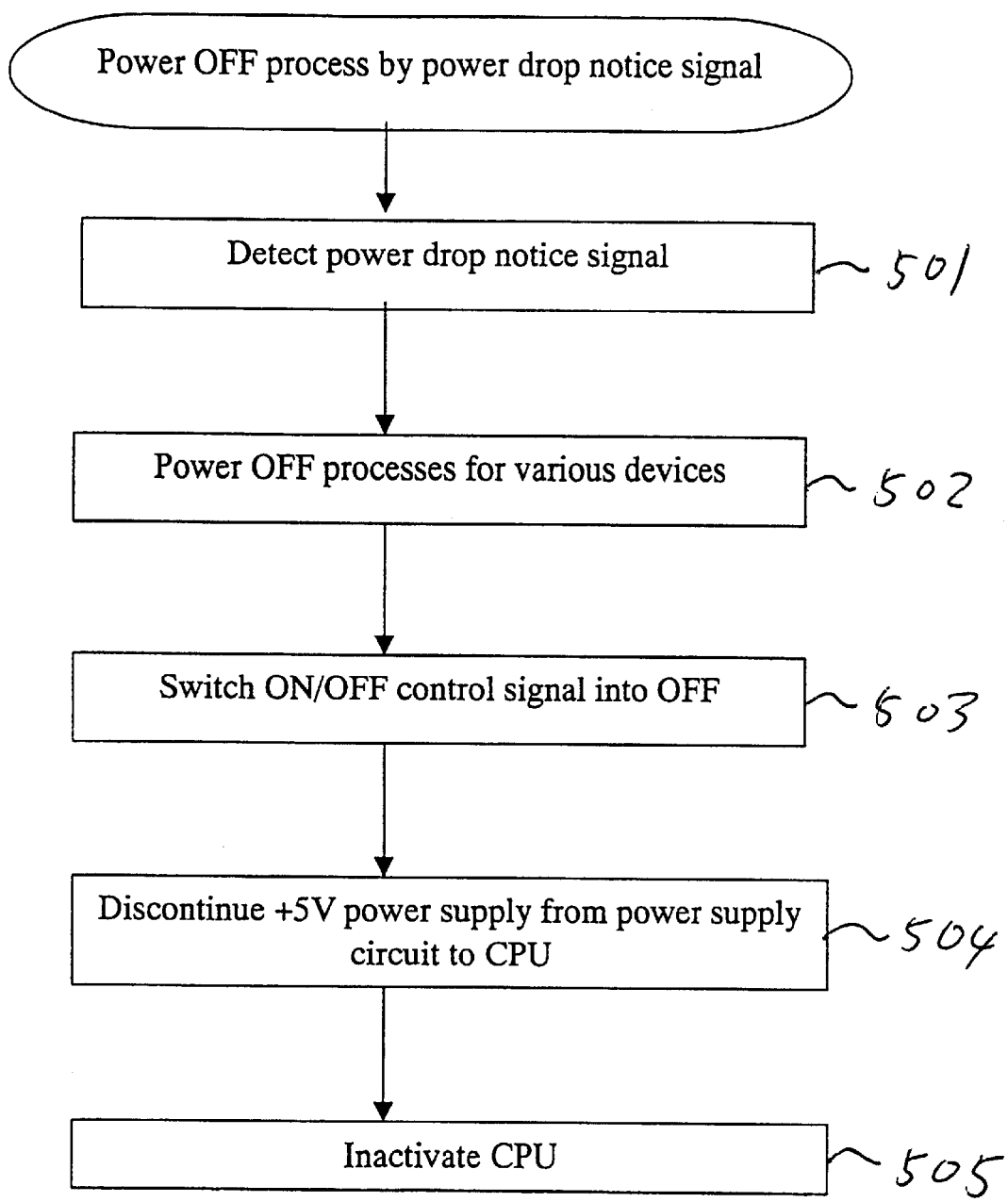
FIG. 5 is a flow chart illustrative of sequential operations of a power controller of FIG. 1 for a power OFF by disconnection of a monitor power cable.

Sequential operations of a power controller of FIG. 1 for a power OFF by disconnection of a monitor power cable will be described with reference to FIG. 5.

In a first step 501, discontinuation of the power supply through the monitor power cable causes a gradual drop of the power form the power supply and the voltage level becomes lower than a critical level, so that a voltage drop notice is noticed by interruption, whereby the voltage drop notice is detected.

In a second step 502, in response to the interruption of the voltage drop notice, power OFF operations for the various devices are carried out.

In a third step 503, the ON/OFF control signal for controlling the power supply circuit is switched into OFF.

In a fourth step 504, the power supply circuit receives the OFF signal and discontinues the supply of the +5V power to the CPU 3.

In a fifth step 505, the CPU 3 receives no supply of the +5V power and enters into an inactivated state.

The power ON sequences and power OFF sequences are executed to change the start up process of the next time from the previous ended process. For example if the previously ended state of the monitor was caused by the power supply discontinuation of the power supply cable due to the inactivation of the computer, then the next time start up is such that the monitor will automatically start up by the next time activation of the computer.

As described above, in accordance with the present invention, the previously ended state data stored in the EEPROM are re-written in end or start up operations by the software switch so that the next time start up operation is changed by depending upon the rewritten data. The next time start up operation depends upon the previously ended state data, for which reason if the previous end was not caused by the software switch operation, then the monitor will start up in association with the start up of the computer.

The power supply to the CPU depends upon the ON/OFF control signal which is controlled by the CPU.

The above power controller allows the peripheral devices to start up in association with the computer with leaving the advantageous points of the software switch.

It is unnecessary that the power supply circuit continues to supply the power to the CPU. This contributes the reduction in power consumption.

Figure 6:
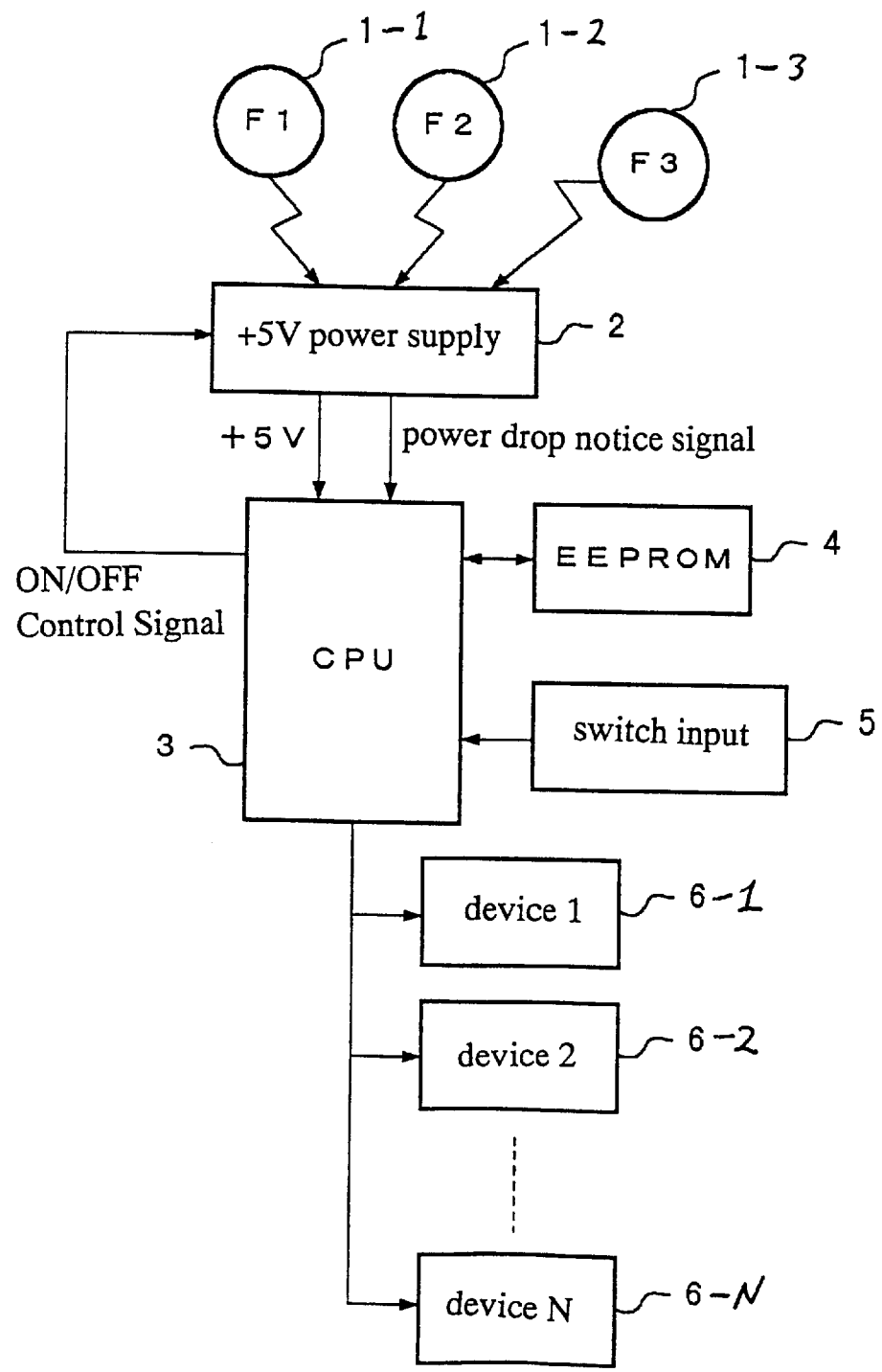
FIG. 6 is a block diagram illustrative of a power controller for software switch in a second embodiment in accordance with the present invention.

A second embodiment according to the present invention will be described in detail with reference to FIG. 6. A structural difference of the novel power controller for the software switch in this second embodiment from that of the first embodiment is only a third external factor F3 as a trigger generated by a +5V power supply notice in an image cable or a trigger generated by an independent +5V power supply notice. The power controller of FIG. 6 is accommodated in a monitor in FIG. 7 or 8.

Figure 7:
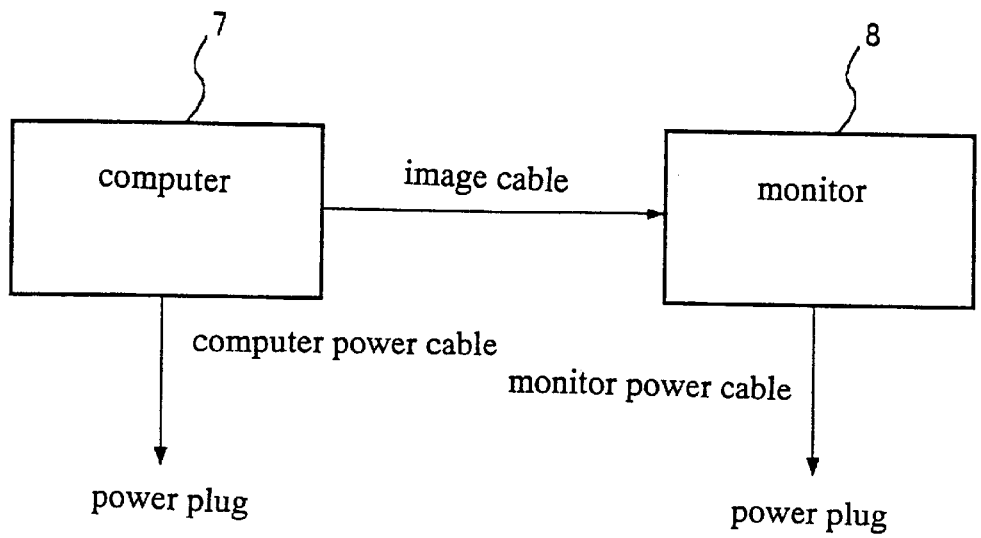
FIG. 7 is a block diagram illustrative of a connection between a computer and a monitor accommodating a power controller of FIG. 6.

With reference to FIG. 7, one of pins of an image cable (D-sub cable) used for sending image data from the computer to the monitor is used as a control terminal for ON/OFF control signal for controlling the +5V power supply to the computer. ON/OFF signal appearing on the control terminal serves as a trigger for starting up the monitor so that, in response to the start up of the computer, the power supply notice is made ON whereby the monitor will start up in association with the start up of the computer. The ON/OFF control is made by the computer so that if the computer is not in service, the power supply notice is made OFF so that the monitor power OFF can be made to reduce the power consumption of the monitor.

Figure 8:
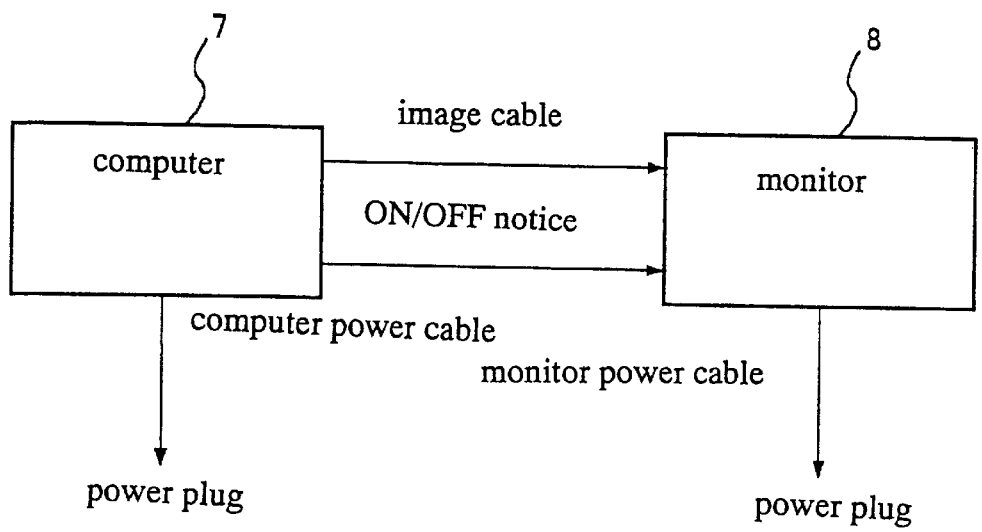
FIG. 8 is a block diagram illustrative of another connection between a computer and a monitor accommodating a power controller of FIG. 6.

With reference to FIG. 8, it is possible that the independent +5V power supply notice can be triggered for the same purpose as that of FIG. 7. In this case, the notice of the trigger may use RS-23C, USB, Accuscss. Bus.

As a modification, it is also possible that the above power controller may be incorporated into not only the monitor but also other computer peripheral devices, so as to allow that the peripheral devices will start up in association with starting up the computer.

As described above, in accordance with the present invention, the previously ended state data stored in the EEPROM are re-written in end or start up operations by the software switch so that the next time start up operation is changed by depending upon the re-written data. The next time start up operation depends upon the previously ended state data, for which reason if the previous end was not caused by the software switch operation, then the monitor will start up in association with the start up of the computer.

The power supply to the CPU depends upon the ON/OFF control signal which is controlled by the CPU.

The above power controller allows the peripheral devices to start Up in association with the computer with leaving the advantageous points of the software switch.

It is unnecessary that the power supply circuit continues to supply the power to the CPU. This contributes the reduction in power consumption.

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims all modifications which fall within the spirit and scope of the present invention.

What is claimed is:

1. A power controller for a peripheral device in a computer system, the power controller comprising:

a peripheral device nonvolatile memory storing data indicating an ON/OFF state of the peripheral device when power was last removed from the computer system;

a peripheral device power supply; and a peripheral device processor connected to said peripheral device power supply and to said peripheral device nonvolatile memory, said peripheral device processor sending an ON control signal upon receipt of a trigger signal, said ON control signal being sent to said peripheral device power supply to temporarily supply power to said peripheral device processor, said peripheral device processor further determining whether said peripheral device nonvolatile memory indicates that the peripheral device was in an ON state or an OFF state when power was last removed from the computer system and, based upon this determination, either instructing said peripheral device power supply to continuously provide power to said peripheral device processor when the peripheral device was in an ON state or sending an OFF control signal to turn off said peripheral device processor when the peripheral device was in an OFF state.

2. The power controller of claim 1, wherein said trigger signal is one of an indication that power is available to the peripheral device and an indication that an ON state has been selected.

3. The power controller of claim 2, wherein said peripheral device processor rewrites the data indicating an ON/OFF state of the peripheral device when power was last removed from the computer system based on said trigger signal.

* * * * *